United States Patent
Baer et al.

(10) Patent No.: US 10,678,276 B2
(45) Date of Patent: Jun. 9, 2020

(54) VALVE DEVICE FOR CONTROLLING A FLUID FLOW AND FLOW CONTROL VALVE

(71) Applicant: HYDAC FLUIDTECHNIK GMBH, Sulzbach/Saar (DE)

(72) Inventors: Harald Baer, Puettlingen (DE); Josef Christian Schaefer, Saarlouis (DE); Ferdinand Friebe, Saarbruecken (DE); Philipp Gandner, Schmelz (DE); Maximilian Gehring, Saarbruecken (DE); Philipp Linnebach, Schiffweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 441 days.

(21) Appl. No.: 15/352,702

(22) Filed: Nov. 16, 2016

(65) Prior Publication Data

US 2018/0135771 A1 May 17, 2018

(51) Int. Cl.
*G05D 23/08* (2006.01)
*G05D 23/02* (2006.01)
*F01P 7/04* (2006.01)

(52) U.S. Cl.
CPC .......... *G05D 23/08* (2013.01); *G05D 23/025* (2013.01); *F01P 7/044* (2013.01)

(58) Field of Classification Search
CPC ...... A01K 15/025; A01K 15/021; H04N 5/77; H04N 5/772; F21V 21/15; F21V 14/02
See application file for complete search history.

(56) References Cited

U.S. PATENT DOCUMENTS

| | | | | |
|---|---|---|---|---|
| 5,236,001 A | * | 8/1993 | Kleles | ................ F16K 11/0716 |
| | | | | 137/625.66 |
| 2010/0213401 A1 | * | 8/2010 | Martin | ................... F01M 5/007 |
| | | | | 251/321 |
| 2010/0303643 A1 | * | 12/2010 | Kataoka | ............... E02F 9/2203 |
| | | | | 417/213 |

(Continued)

FOREIGN PATENT DOCUMENTS

| | | |
|---|---|---|
| DE | 36 17 262 | 11/1987 |
| DE | 297 05 018 | 6/1997 |
| DE | 199 63 499 | 2/2001 |

(Continued)

OTHER PUBLICATIONS

Ohigata et al., Rate of Flow Control Device of Hydraulic Circuit, Dec. 14, 1999, JPH11344004A, Whole Document.*

(Continued)

*Primary Examiner* — Larry L Furdge
(74) *Attorney, Agent, or Firm* — Wenderoth, Lind & Ponack, L.L.P.

(57) ABSTRACT

A valve device for controlling a fluid flow includes a flow control valve (15) having a valve housing (19) with a supply connection (9) and a user connection (11). A valve piston (17) is guided inside the valve housing (19) longitudinally moveable and controls the passage to the user connection (11) by a thermocouple (61) via an orifice (37, 39) depending on the temperature of the fluid flow. A pressure compensator (21) is connected to the supply connection (9) and keeps the pressure drop across the orifice (37, 39) constant.

18 Claims, 5 Drawing Sheets

(56) References Cited

U.S. PATENT DOCUMENTS

2015/0308468 A1   10/2015   Bosch

FOREIGN PATENT DOCUMENTS

| DE | 10 2006 039554 |    | 3/2008  |
|----|----------------|----|---------|
| DE | 10 2010 007247 |    | 8/2011  |
| FR | 2547222 A1     | *  | 12/1984 |
| JP | H08145233 A    | *  | 6/1996  |
| JP | H11344004 A    | *  | 12/1999 |
| WO | 2014/106535    |    | 7/2014  |

OTHER PUBLICATIONS

Moal, Method for Limiting the Movements of the Hydromechanical Locking Members . . . , Dec. 14, 1984, FR2547222A1, Whole Document (Year: 1984).*

Suda, Flow Control Valve and Flow Control Circuit, Jun. 7, 1996, JPH08145233A, Whole Document (Year: 1996).*

German Examination Report dated Apr. 28, 2016 in German Application No. 10 2015 010 849.2.

Extended European Search Report dated Dec. 23, 2016 in European Application No. 16001585.5.

* cited by examiner

VALVE DEVICE FOR CONTROLLING A FLUID FLOW AND FLOW CONTROL VALVE

FIELD OF THE INVENTION

The invention concerns a valve device for controlling a fluid flow, and a flow control valve particularly provided for such a valve device.

BACKGROUND OF THE INVENTION

Valve devices comprising a flow control valve where the passage of the control valve can be controlled by a thermocouple in such a way that the power of the fluid flow arriving at a user may be controlled depending on the temperature, are prior art. Such valve devices, which are commonly called "thermostat", are used in many different applications, in particular for hydraulic pressurising media, which flows via a thermocouple-controlled orifice to a corresponding user at a temperature-dependent flow rate. When supplying users the reliable function of which is the prerequisite for the operational reliability of an associated system, as is the case for example with a hydraulic fan drive for a cooling system, care must be taken that the control of the flow rate that drives the respective hydraulic motor takes place in accordance with a corresponding specified characteristic curve.

SUMMARY OF THE INVENTION

Based on the above described problem, an object of the invention to provide a valve device having a passage that may be controlled by a thermocouple depending on the temperature of the fluid flow, which valve is characterised by a particularly favourable operating performance.

According to the invention, this object is basically achieved by a valve device being a flow control valve that comprises a valve housing with at least one supply connection, one user connection and one tank connection. A valve piston is guided inside the valve housing longitudinally moveable and controls the passage to the user connection by a thermocouple via an orifice depending on the temperature of the fluid flow. A pressure compensator is connected to the tank connection and keeps the respective pressure drop across the orifice constant. As a result of the pressure compensator, the entire control process becomes independent from the load pressure. A constant progression of the temperature/flow rate characteristic can then be achieved across the entire control range so that a user, such as a hydraulic motor of a fan drive for example, always operates at the correct speed that corresponds to the respective temperature. The control process advantageously takes place purely mechanically and contains no electronic components whatsoever.

Particularly advantageously, the flow control valve, including its thermocouple, is connected via its supply connection to a pressure supply source, such as a hydraulic pump. One control side of the pressure compensator is connected to the supply connection. The output pressure of the user connection is applied to the other control side of the pressure compensator.

In a particularly preferred manner, the controlling function of the fluid flow can be designed in such a way that it begins above a presettable starting temperature and that the maximum fluid flow rate is achieved at a specified final temperature, where a hysteresis exists in the temperature curve between heating up and cooling down. Such a curve is particularly advantageous in connection with a fan drive that is associated with the cooling system of the respective pressurising fluid, where the fan drive should only start at a lower temperature threshold, where the fan speed is to increase in a rising temperature range and should have the maximum speed at the final temperature. A certain hysteresis exists between heating up and cooling down due to the thermal inertia of the components, which also have to be cooled off as the temperature decreases.

In addition to both of the above-mentioned valves, a pressure limiting valve may be employed, as well as an anti-cavitation function if operating in a closed fluid circuit.

A flow control valve that is particularly applicable for the valve device according to the invention bears the characteristics of a flow control valve of the type known from the document DE 43 08 297 A1, comprising a valve housing with at least one supply connection and one user connection and a valve piston that is guided inside the valve housing longitudinally moveable. The valve piston controls the passage to the user connection via an orifice under the influence of a shape memory alloy thermocouple depending on the temperature of the fluid flow. The described and known flow control valve uses as a thermocouple a memory element that is produced as a solid body from an alloy. Memory elements of this kind exhibit a temperature-dependent deformation within a temperature range of approximately 10° Kelvin, which results in relatively small changes in length. The changes are in the range of 150 µm at a length of the memory element of approximately 4 mm. The known flow control valve is then unsuitable for application in the valve device according to the invention where, for the intended control processes such as the temperature-controlled operation of a fan drive, relatively large control strokes of the valve piston are required. If a flow control valve of the kind known from the above-stated document were used, it would be necessary to provide a memory element of excessive length or to string together such memory elements, which would in both instances lead to an overall length of the shape memory alloy thermocouple that is impractical for use in the valve device according to the invention.

Due to that impracticality, in the flow control valve according to the invention, the shape memory alloy thermocouple has at least one spring element with a plurality of windings. Much larger strokes can then be achieved compared to those of a solid-body thermocouple acting as the actuator when measuring the overall length in the same direction of the longitudinal operating direction of the actuator, because the effective string length of the memory alloy is distributed over a corresponding number of windings that extend transverse to the longitudinal operating direction. Thus, only a fraction of the temperature-dependent, form-changing spring length of the memory alloy contributes to the overall length of the thermocouple, such that the valve device according to the invention can be in an advantageous and compact design.

The alloy of the respective spring element may have a one-way memory effect or a two-way memory effect. In the instance of the application of a one-way memory effect, the valve piston is preferably returned by a return spring into a starting position in which the orifice is closed. Because the return spring closes the orifice in a starting position, such embodiment is particularly suitable for controlling the supply feed of a user, such as a fan drive, since the supply to the user only commences from a threshold value of the temperature in a range in which the memory element opens the orifice against the effect of the return force.

In an advantageous manner, the temperature control range can be expanded through the combination of a plurality of alloys that exhibit a shape memory effect at different temperatures, and/or of different shape memory alloys through cascade-shaped combinable spring elements.

The flow control valve may have a simple design in which the respective spring element that forms the thermocouple and the return spring each act on opposite sides of the valve piston.

In particularly advantageous exemplary embodiments, the free travel path of the valve piston may be definable via an adjustable end stop at which the valve piston stops when the orifice cross-section is fully open as soon as the force of the respective spring element is greater than the sum of the return spring force and the flow force, depending on the fluid flow that is to be controlled by the orifice. For example in the instance of a fan drive, the maximum speed of the supplied fan drive can be limited to a safe, predefinable speed.

In a particularly advantageous design of the flow control valve, the valve housing is provided with three radially disposed bore holes that correspond to the supply connection, the user connection and a link connection that leads via the pressure compensator to the tank, and that ends on the inside of the valve housing that retains the valve piston. This valve piston establishes a permanent fluid connection in each of its positions between supply connection and link connection, in which the respective spring element is disposed in the vicinity of the permanent fluid supply. In this arrangement the spring element, which serves as thermocouple, is continually submerged inside the flow of the fluid, thus ensuring optimal heat coupling between fluid and thermocouple.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
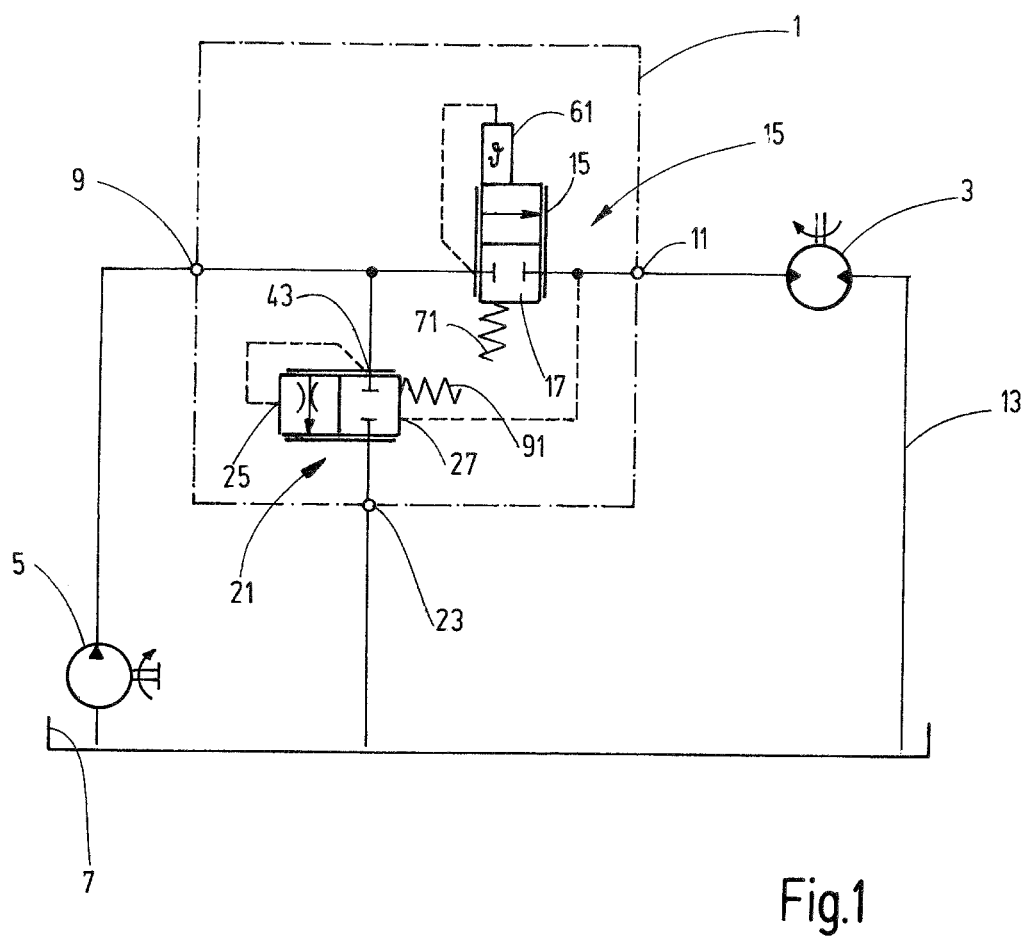
FIG. 1 is a schematic diagram of a fluid circuit of a valve device according to an exemplary embodiment of the invention.

The invention is now explained by way of an exemplary embodiment with reference to the attached drawings, where the valve device 1 in FIG. 1 is provided for a temperature-dependently controlled supply of a hydraulic motor 3, which in the present example is a fan drive of a cooling system (not shown in the drawings). The fluid system depicted in FIG. 1 comprises as a pressure supply source a motor-driven hydraulic pump 5, which takes pressurising fluid from a tank 7 and is connected with its discharge side to supply connection 9 of a flow control valve 15 of the valve device 1. The user connection 11 of flow control valve 15 is connected to the hydraulic motor 3. At the discharge end, hydraulic motor 3 is connected to tank 7 via a return line 13.

The valve device 1 comprises a flow control valve 15 in form of a proportional 2/2-way valve with a valve piston 17 that is able to move longitudinally in valve housing 19. Moreover, the valve device 1 is provided with a pressure compensator 21, which is disposed between the supply connection 9 of the flow control valve 15 and a tank connection 23. The one control side 25 of the pressure compensator 21 is connected to the supply connection 9. The output pressure of the user connection 11 is applied to the other control side 27 of the pressure compensator 21.

Figure 2:
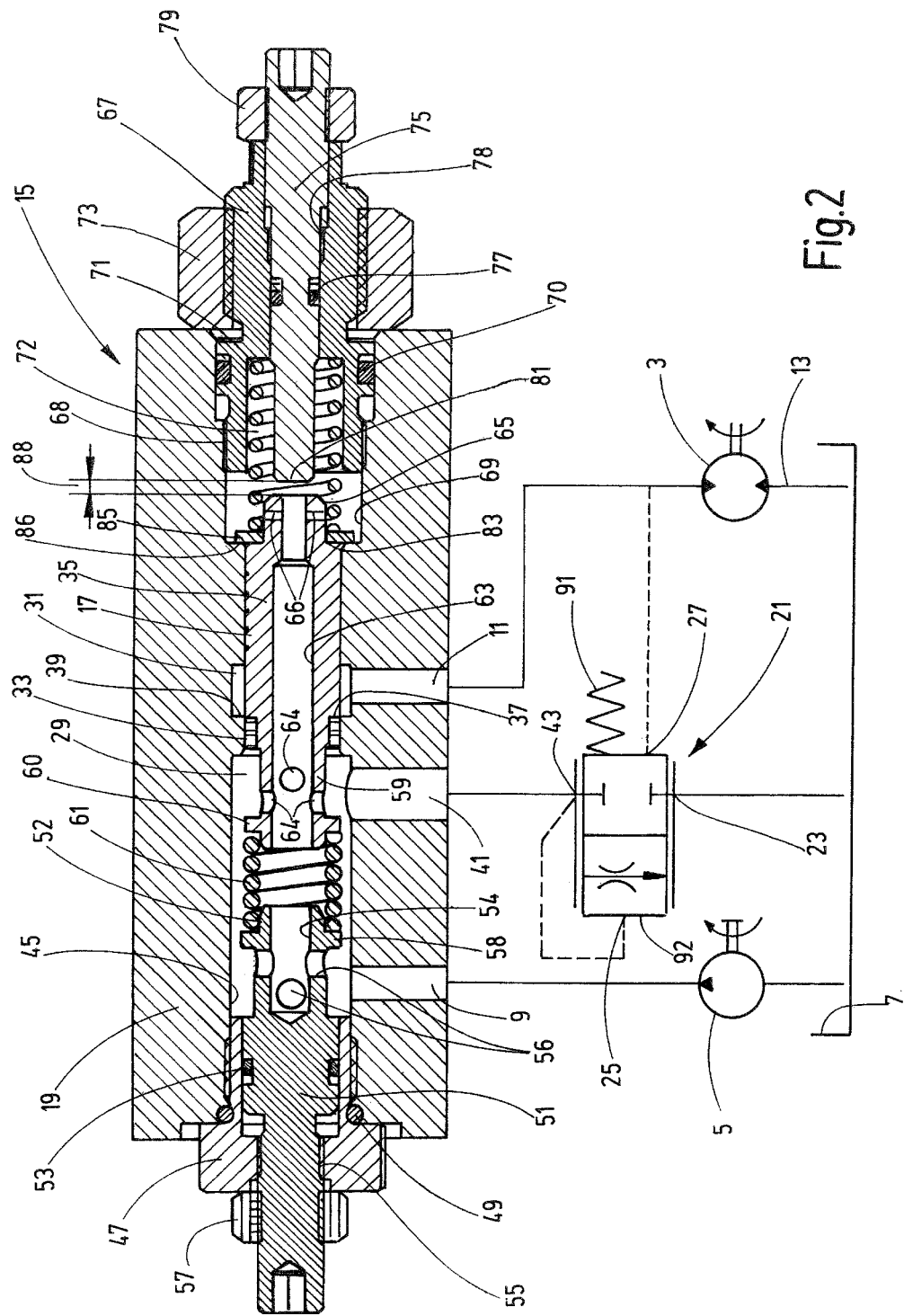
FIG. 2 is partially a side view in section and partially a schematic diagram of the exemplary embodiment of the valve device, which depicts a starting position with a starting temperature of the fluid that lies below a threshold.
Figure 3:
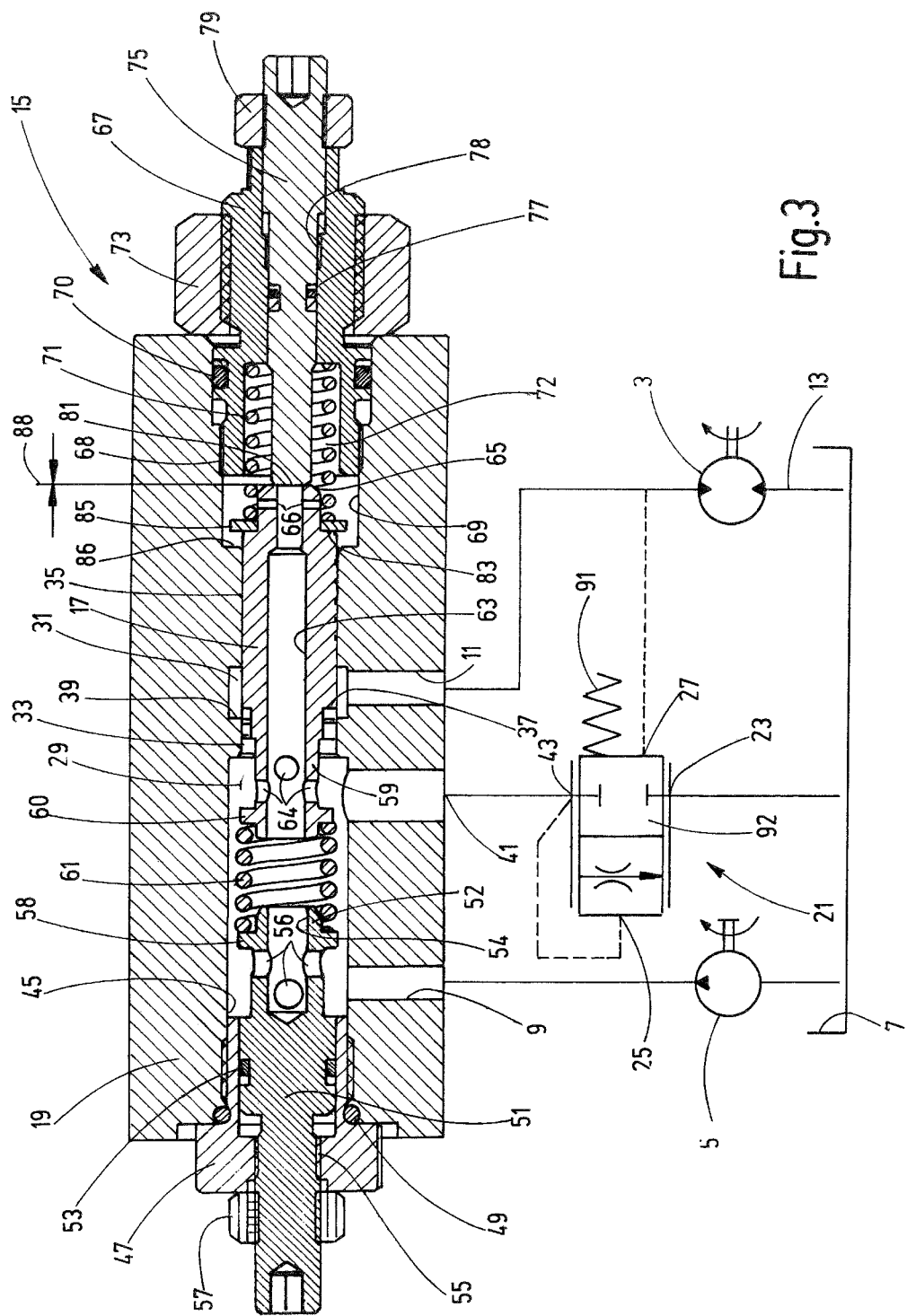
FIGS. 3 and 4 are partially side views in section and partially schematic diagrams of the valve device of FIG. 1 in an end position and an intermediate position, respectively.
Figure 4:
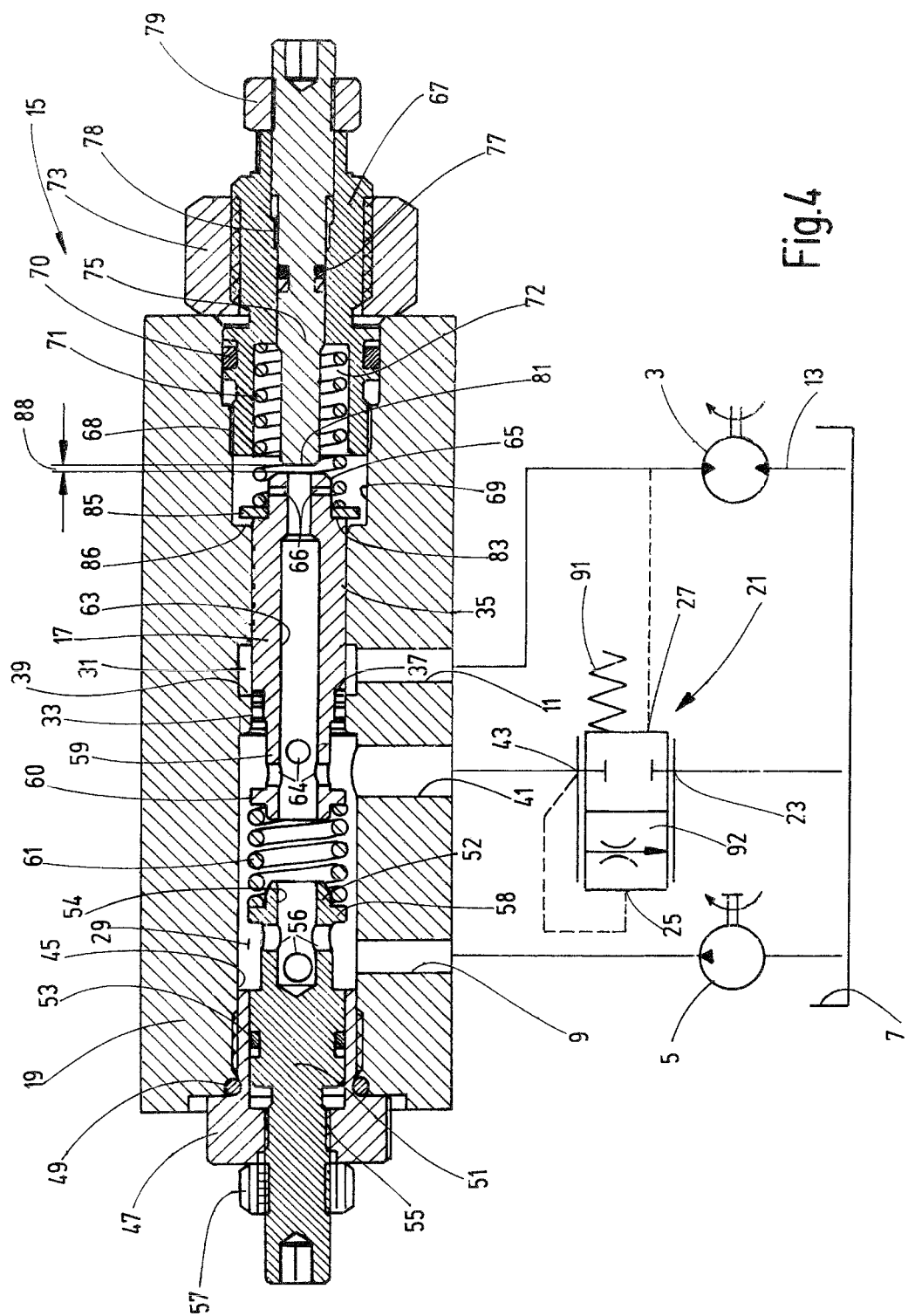

More detailed design aspects of the flow control valve 15 are apparent in FIGS. 2 to 4. As shown, the valve housing 19, in which the valve piston 17 is guided axially moveable, is provided with radial connection bore holes, which form the supply connection 9 and the user connection 11. A third connection bore hole is disposed between supply connection 9 and user connection 11, which third connection bore acts as a link connection 41 for the pressure compensator 21 and is connected to the input side 43 of pressure compensator 21. The connection bore holes of the supply connection 9 and the link connection 41 terminate in valve housing 19 in the same pressure chamber 29, so that the link connection 41 forms a direct fluid connection between the supply connection 9 and the inlet 43 of the pressure compensator 21. The pressure chamber 29 is disposed in valve housing 19 in the end section 45 of the housing bore, shown on the left end-section 45 of the housing bore hole. The end of the end section 45 is pressure-sealed by a threaded end plug 47, which is sealed against the housing 19 through an O-ring 49. Disposed inside of the end plug 47 is an element holder 51, the axial position of which is adjustable within end plug 47. Element holder 51 is sealed by a sealing element 53 against the inside of the end plug 47. To provide for the axial position adjustment of the element holder 51, the holder 51 passes through an adjusting thread 55 inside end plug 47. The adjusted setting is secured by a lock nut 57.

The user connection 11 terminates in valve housing 19 in a chamber 31, which is offset from the pressure chamber 29 in the direction of the right-hand end of the valve housing 19. Chamber 31 is separated from pressure chamber 29 by a radially inwardly protruding projection 33 of valve housing 19. At the transition to a guide section 35, which exhibits the largest piston diameter and with which the piston 17 is guided inside housing 19, the valve piston 17 forms a control edge 37. Control edge 37 forms an orifice in conjunction with a step 39 that is formed at the projection 33. The orifice controls the fluid path between the pressure chamber 29 and the chamber 31 at the user connection 11 independent from the piston position.

The position-adjustable element holder 51 is provided with a reduced-diameter end section 52, which extends into the pressure chamber 29, which is provided with an internal coaxial bore 54, which in turn is provided with radial transverse bore holes 56. Moreover, the end section 52 forms in the vicinity of its free end a radially protruding collar 58. Collar 58 provides the abutment for one end of a spring element 61 in form of a spiral spring made from a one-way memory alloy. Beginning from the step that forms the control edge 37, the valve piston 17 is provided with an end section 59. End section 59 has a reduced external diameter, has a shape similar to the end section 52 of the element holder 51, and extends into the pressure chamber 29. Located in vicinity of the free end of this end section 59 is also a collar 60, which forms the abutment for the other end of the spring element 61. Starting from the internal end that is located in pressure chamber 29, the valve piston 17 is provided with a coaxial bore hole 63. From bore hole 63 radial, transverse boreholes 64 provide ports into the pressure chamber 29. The end of the bore hole 63, shown in the drawing on the right, has towards the end 65 of the valve piston 17 a reduced internal diameter and also radial, transverse bore holes 66 that lead to the outside of the piston.

The valve housing 19 features at the right-hand end in FIGS. 2-4 a plug with a screw insert 67. Insert 67 is screwed in by a thread 68 that is located in the expanded end section 69 inside the valve housing 19. The screw insert 67 is sealed towards the housing 19 by an O-ring 70. The screw insert 67 is provided with an axial passage, the internal diameter of which is stepped in such a way that following on from the free internal end an enlargement 72 is formed as a spring recess. The spring recess accepts part of the length of a return spring 71 in form of a spiral compression spring. Following the enlargement 72, the internal passage forms the guide for an axially position-adjustable end stop pin 75. Stop pin 75 is sealed towards the inside of the passage by means of an O-ring 77. To adjust the axial position of the end stop pin 75, it is screwed in by an adjusting thread 78 into the screw insert 67. The position may be secured by a lock nut 79. Thus, the end stop pin 75 forms with its free end an end stop 81 against which the valve piston 17 rests at the end of its travel to the right. The end of the return spring 71 that faces the valve piston 17 presses against an annular disc 85, which is seated on the reduced-diameter end section of the valve piston 17, which in turn abuts against a step 83 of the valve piston 17.

FIG. 2 depicts the valve piston 17 in a starting position in which the annular disc 85 rests against a step 86 at the transition of the expanded section 69 to the guide section of the housing, so as to provide an end stop that counteracts the return force of the return spring 71 that generates the travel movement of the valve piston 17. In the starting position the control edge 37 of the valve piston 17 covers the step 39 at the projection 33 so that the orifice between the pressure chamber 29 and the chamber 31 of the user connection 11 is fully closed. Since there is no pressure present at the user connection 11 and consequently no pressure at the control side 27 of the pressure compensator 21, the other control side 25 of which is exposed to the supply pressure from link connection 41. The entire fluid flow then drains away via the pressure compensator 21 to tank 7. The spring element 61, which is made from a one-way memory alloy, causes with rising fluid temperature a control stroke of the valve piston 17 against the force of the return spring 71, which leads to the opening of the orifice that is formed between control edge 37 and step 39. FIG. 3 depicts the operating state when reaching a final temperature, where with a fully extended compression spring formed by the thermocouple 61, the valve piston 17 is displaced against the force of the return spring 71 until the end 65 of the valve piston 17 rests against the end stop 81 of the end stop pin 75. The distance 88 in FIG. 2 is reduced to zero, and the orifice between pressure chamber 29 and chamber 31 of the connection 11 has the largest opening cross-section in the end position of FIG. 3.

FIG. 4 depicts the state at a temperature that lies between the starting temperature, which corresponds to the valve position in FIG. 2, and the final temperature, which corresponds to the valve position shown in FIG. 3. In this temperature range the valve piston 17 is in balance between the force of the spring element 61 that expands due to the rising temperature of the fluid and the sum of the force of the return spring 71 and the flow force, which occurs at the orifice formed between the control edge 37 and step 39, where that orifice opens in accordance with the force of the spring element 61 that displaces the valve piston 17. The distance 88 between the valve piston end 65 and end stop 81 then has a value that lies between the highest value at the starting temperature of the fluid shown in FIG. 2 and the zero value shown in FIG. 3, which corresponds to the fully open orifice at the final temperature.

In that control range between the starting temperature and the final temperature, the pressure compensator 21 keeps the pressure drop across the control edge 37 of the valve piston 17 always constant at all opening sizes of the formed orifice. The control function then is independent from the load pressure. The amount of the pressure drop is adjustable via a compression spring 91, which preloads the valve spool 92 of the pressure compensator 21 at its control side 27 together with the pressure of the user connection 11, and which is opposed by the supply pressure that is present at the other control side 25 of the valve spool 92. The control action is therefore independent from the load pressure and has a constant characteristic.

Figure 5:
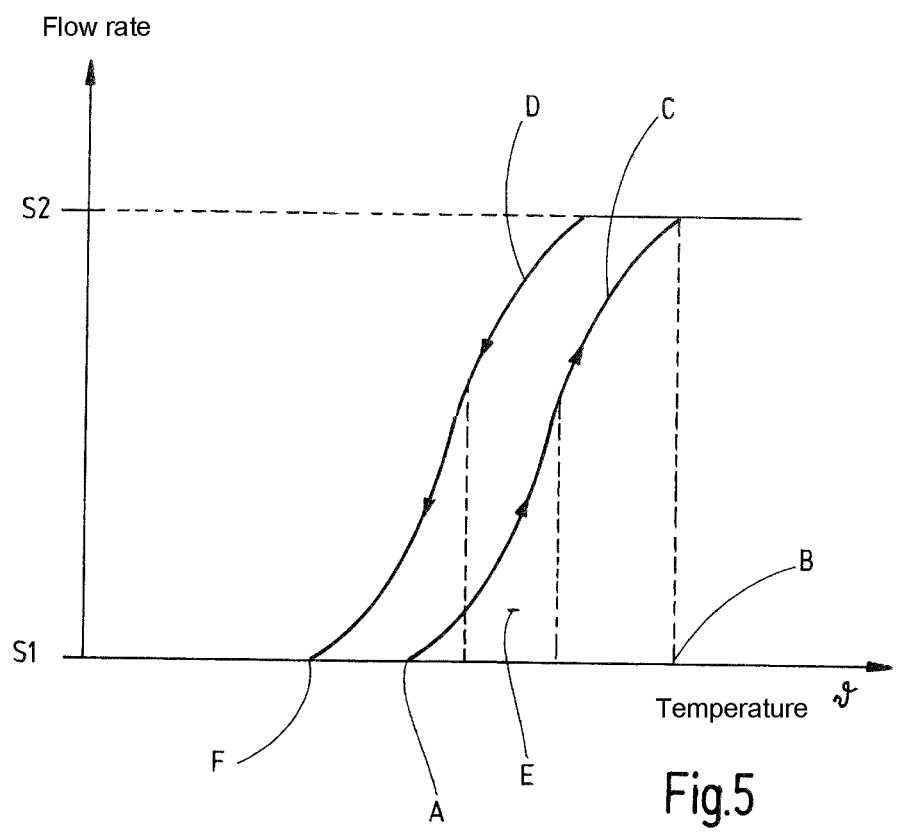
FIG. 5 is a diagram of the flow rate over the fluid temperature for rising and falling temperature curves in the flow control valve of the valve device of FIG. 1.

FIG. 5 depicts, for a rising fluid temperature from a starting temperature A to a final temperature B, the increase of the flow rate along a curve C, where the flow rate changes from the value zero, designated with S1, to the maximum flow rate designated with S2. The letter D indicates a decreasing temperature curve starting from the final temperature B, which is displaced with respect to curve C by a hysteresis amount that is designated with E. Due to the thermal inertia of the components involved, the decrease of the flow rate when the fluid cools down starts with a small delay, and the complete closure of the orifice only occurs at a temperature F that lies below the starting temperature A. Since the pressure compensator 21 keeps the pressure drop constant across the orifice, formed by control edge 37 and step 39, even if the fluid temperature rises above the final temperature B at which the orifice is fully open and the end 65 of the valve piston 17 rests against end stop 81, the maximum flow rate towards the user connection 11 remains constant even in this instant. Due to the adjustment of end stop 81, according to the positional setting of the end stop pin 75, a reliable maximum speed may be set for the hydraulic motor 3. Since the shape memory spring element 61 is disposed in the pressure chamber 29 between the supply connection 9 that forms the flow inlet and the link connection 41 that leads to the pressure compensator 21, the spring element 61 is permanently submerged in the fluid flow not only on its outside, but also on the inside via the internal bore hole 54 at the end section 52 of the element holder and via the internal bore hole 63 in valve piston 17. The spring element 61 then is externally and internally in fluid contact, and an optimal heat transfer from fluid to spring element 61 is achieved.

While one embodiment has been chosen to illustrate the invention, it will be understood by those skilled in the art that various changes and modifications can be made therein without departing from the scope of the invention as defined in the claims.

The invention claimed is:

1. A valve device for controlling a fluid flow, the valve device comprising:
    a flow control valve having a valve housing with separate first and second radially extending bore holes forming a supply connection and a user connection, respectively, and with a separate third radially extending bore hole;

a valve piston guided inside said valve housing for longitudinal movement controlling passage of fluid from said supply connection to said user connection via an orifice formed between said valve piston and said valve housing;

a thermocouple in said valve housing controlling longitudinal positions of said valve piston in said valve housing, opening said orifice when a temperature of the fluid flowing in said valve housing reaches a threshold temperature and closing said orifice when the fluid flowing through said valve housing is below the threshold temperature; and a pressure compensator connected in fluid communication to said supply connection to keep a pressure drop across said orifice constant, said third radially extending bore hole forming a link connection to a tank via said pressure compensator, ending inside said valve housing and establishing a permanent connection in fluid communication with said supply connection in all positions of said valve piston, said thermocouple being in a vicinity of said permanent connection to be constantly contacted with flow at said thermocouple from said supply connection to at least one of said third bore hole or said user connection.

2. The valve device according to claim 1 wherein
said flow control valve and said thermocouple therein are connected via said supply connection in fluid communication to a hydraulic pump;
a first control side of said pressure compensator is connected in fluid communication to said supply connection; and
a second control side of said pressure compensator receives output pressure of said user connection.

3. The valve device according to claim 1 wherein
said flow control valve and said pressure compensator initiate fluid flow to said user connection above the threshold temperature, achieve a maximum flow rate at a specified final temperature and provide a hysteresis in a temperature curve between heating up and cooling down of the fluid flowing in said valve housing.

4. The valve device according to claim 1 wherein
said thermocouple is a spring element with a plurality of windings and acting on a first end of said valve piston; and
a return spring in said valve housing acts on a second end of said valve piston, said first end being opposite said second end.

5. The valve device according to claim 4 wherein
said spring element has an alloy with at least one of a one-way memory effect or a two-way memory effect.

6. The valve device according to claim 4 wherein
said spring element comprises of a least one of a combination of a plurality of alloys exhibiting a shape memory effect at different temperatures or different shape memory alloys of cascade-shaped combinable spring elements to expand a temperature control range.

7. The valve device according to claim 4 wherein
a free travel path of said valve piston is defined via an adjustable end stop engaged by said valve piston when a cross section of said orifice if fully open as soon as a force of said spring element is greater than a sum of forces of said return spring and the fluid.

8. A flow control valve for a valve device, the flow control valve comprising:
a valve housing with first and second radially extending bore holes forming a supply connection and a user connection, respectively, and with a separate third radially extending bore hole;

a valve piston guided inside said valve housing for longitudinal movement controlling passage of fluid from said supply connection to said user connection via an orifice formed between said valve piston and said valve housing;

a shape memory alloy thermocouple influencing the movement of said valve piston in said valve housing depending on temperature of the fluid flowing in said valve housing such that said orifice is opened upon the fluid flowing through said valve housing reaching a threshold temperature and is closed when the fluid flowing through said valve housing is below the threshold temperature, said thermocouple being a spring element with a plurality of windings and acting on a first end of said valve piston, said third bore hole forming a link connection to a tank, ending inside said valve housing and establishing a permanent connection in fluid communication with said supply connection in all positions of said valve piston, said element spring being in a vicinity of said permanent connection to be constantly contacted by flow at said thermocouple from said supply connection to at least one of said third bore hole or said user connection; and a return spring in said valve housing acting on a second end of said valve piston, said first end being opposite said second end.

9. The flow control valve according to claim 8 wherein
said spring element has an alloy with at least one of a one-way memory effect or a two-way memory effect.

10. The valve device according to claim 8 wherein
said spring element comprises of a least one of a combination of a plurality of alloys exhibiting a shape memory effect at different temperatures or different shape memory alloys of cascade-shaped combinable spring elements to expand a temperature control range.

11. The valve device according to claim 8 wherein
a free travel path of said valve piston is defined via an adjustable end stop engaged by said valve piston when a cross section of said orifice if fully open as soon as a force of said spring element is greater than a sum of forces of said return spring and the fluid.

12. The valve device according to claim 8 wherein
a pressure compensator is connected in fluid communication to said supply connection to keep a pressure drop across said orifice constant.

13. The valve device according to claim 8 wherein
said second spring is connected to said supply connection in fluid communication therewith via a bore hole in said valve piston.

14. The valve device according to claim 4 wherein
said second spring is connected to said supply connection in fluid communication therewith via a bore hole in said valve piston.

15. A valve device for controlling a fluid flow, the valve device comprising:
a flow control valve having a valve housing with a supply connection and a user connection;

a valve piston guided inside said valve housing for longitudinal movement controlling passage of fluid from said supply connection to said user connection via an orifice formed between said valve piston and said valve housing, said valve piston having opposite first and second longitudinal ends;

a thermocouple in said valve housing controlling longitudinal positions of said valve piston in said valve housing being located at said first longitudinal end, opening said orifice when a temperature of the fluid flowing in said valve housing reaches a threshold temperature and closing said orifice when the fluid flowing through said valve housing is below the threshold temperature; and a return spring being at said second longitudinal end and biasing said valve piston towards said thermocouple, said return spring being connected to said supply connection in fluid communication therewith via a piston bore hole in said valve piston.

16. The valve device according to claim 15 wherein said thermocouple is a spring element with a plurality of windings acting on said first longitudinal end of said valve housing.

17. The valve device according to claim 15 wherein said spring element has an alloy with at least one of a one-way memory effect or a two-way memory effect.

18. The valve device according to claim 15 wherein said valve housing comprises separate first, second and third radially extending housing bore holes, said first and second housing bore holes form said supply connection and said user connection, respectively, said third housing bore hole forming a link connection connected to a tank, ending inside said valve housing and establishing a permanent connection in fluid communication with said supply connection in all positions of said valve piston, said thermocouple element being in a vicinity of said permanent connection to be constantly contacted with flow therethrough.

* * * * *